US009426457B2

(12) United States Patent
Kim

(10) Patent No.: US 9,426,457 B2
(45) Date of Patent: Aug. 23, 2016

(54) TEST SOCKET FOR CAMERA MODULE

(71) Applicant: PRIMETECH CO., LTD, Incheon (KR)

(72) Inventor: Haeng-Su Kim, Ansan-si (KR)

(73) Assignee: PRIMETECH CO., LTD, Incheon (KR)

( * ) Notice: Subject to any disclaimer, the term of this patent is extended or adjusted under 35 U.S.C. 154(b) by 404 days.

(21) Appl. No.: 13/896,890

(22) Filed: May 17, 2013

(65) Prior Publication Data
US 2014/0204219 A1    Jul. 24, 2014

(30) Foreign Application Priority Data

Jan. 22, 2013  (KR) .................. 10-2013-0006973

(51) Int. Cl.
G01R 31/26 (2014.01)
H04N 17/00 (2006.01)
(52) U.S. Cl.
CPC ................... H04N 17/002 (2013.01)
(58) Field of Classification Search
CPC .................................................. H04N 17/002
USPC ...................................... 324/756.02; 348/187
See application file for complete search history.

(56) References Cited

U.S. PATENT DOCUMENTS

| 7,714,310 | B2* | 5/2010 | Kim | ................. | H01L 27/14618 250/559.45 |
| 2007/0290703 | A1* | 12/2007 | Hollman | ............. | G01R 1/07392 324/750.14 |
| 2009/0015279 | A1* | 1/2009 | Cho | ..................... | G01R 1/0483 324/756.02 |
| 2012/0169885 | A1* | 7/2012 | Wang | .................... | G03B 43/00 348/180 |
| 2012/0229652 | A1* | 9/2012 | Lee | ......................... | G03B 3/10 348/187 |

FOREIGN PATENT DOCUMENTS

CN         201479319 U  *  5/2010
JP         08064645 A      3/1996
(Continued)

OTHER PUBLICATIONS

Japanese Office Action dated Aug. 8, 2014, citing the above reference(s).
(Continued)

*Primary Examiner* — Arleen M Vazquez
*Assistant Examiner* — Robert P Alejnikov, Jr.
(74) *Attorney, Agent, or Firm* — Hauptman Ham, LLP

(57) ABSTRACT

Disclosed herein is a test socket for camera modules, which enables automated inspection of camera modules. The test socket for camera modules includes a base plate provided with a loading unit on which a camera module to be tested is placed; a slider formed on the base plate and horizontally movable thereon; an upper plate formed on the slider to move up or down thereon, and including a cover corresponding to an upper portion of the camera module; a vertical cylinder allowing the upper plate to vertically reciprocate with respect to the slider; and a pin block formed on the loading unit or the cover and connected to a contact point of the camera module.

6 Claims, 5 Drawing Sheets

(56) References Cited

FOREIGN PATENT DOCUMENTS

| | | | |
|---|---|---|---|
| JP | 09298257 | A | 11/1997 |
| JP | 2001116794 | A | 4/2001 |
| JP | 2006220505 | A | 8/2006 |
| JP | 2007163453 | A | 6/2007 |
| JP | 2008224682 | A | 9/2008 |
| JP | 2011-171011 | * | 9/2011 |
| JP | 2011171011 | A | 9/2011 |
| KR | 100759081 | | 9/2007 |
| KR | 101019417 | | 3/2010 |

OTHER PUBLICATIONS

Japanese Office Action dated Feb. 24, 2015, citing the above reference(s).

Chinese Office Action dated May 7, 2015, citing the above reference(s).

* cited by examiner

TEST SOCKET FOR CAMERA MODULE

CROSS-REFERENCE TO RELATED APPLICATION

This application claims priority to Korean Patent Application No. 10-2013-0006973 filed on 22 Jan. 2013, and all the benefits accruing therefrom under 35 U.S.C. §119, the contents of which is incorporated by reference in its entirety.

BACKGROUND

1. Technical Field

The present invention relates to a test socket for camera modules, and more particularly, to a test socket for camera modules, which enables automated inspection of camera modules.

2. Description of the Related Art

Recently, most mobile communication terminals are provided with a miniature camera to which a complementary metal-oxide semiconductor (CMOS) or a charge-coupled device (CCD) image sensor is applied.

For miniature cameras, a camera module is manufactured by mounting a CMOS or CCD image sensor on a printed circuit board (PCB) and assembling a lens and a housing thereto, and is finally electrically connected to a flexible PCB for electrical communication with the outside. Then, the finished camera module is tested to verify normal operation thereof.

To verify normal operation of the camera module, the camera module is positioned at a location separated a predetermined distance from a screen of a monitor, and controlled to photograph a test image when the test image is displayed on the screen of the monitor. Then, an operator manually determines whether the camera module normally operates through inspection of the photographed image.

One example of techniques related to the present invention is disclosed in Korean Patent No. 10-1019417 (published on Mar. 7, 2011) entitled "TEST SOCKET FOR CAMERA MODULES".

BRIEF SUMMARY

One aspect of the present invention is to provide a test socket for camera modules, which enables automated inspection of camera modules.

In accordance with one aspect of the present invention, a test socket for camera modules includes a base plate provided with a loading unit on which a camera module to be tested is placed; a slider formed on the base plate and horizontally movable thereon; an upper plate formed on the slider to move up or down thereon, and including a cover corresponding to an upper portion of the camera module; a vertical cylinder allowing the upper plate to vertically reciprocate with respect to the slider; and a pin block formed on the loading unit or the cover and connected to a contact point of the camera module.

The vertical cylinder may be reciprocated by pneumatic or hydraulic pressure.

The loading unit may include an adsorption groove connected to a vacuum unit.

The cover may include a through-hole through which a lens unit of the camera module is exposed.

The slider may be reciprocated between a forward location close to the camera module and a backward location separated from the camera module, and the cover may be placed vertically above the camera module at the forward location and may be spaced from the camera module at the backward location.

The cover may be moved down to allow the camera module to be secured between a seating portion and the cover when the slider is placed at the forward location.

The loading unit and the cover may be detachably attached to the test socket.

According to the present invention, the test socket for camera modules is automatically operated to closely and firmly hold and inspect a camera module when the camera module is placed thereon, thereby enabling automated or semi-automated inspection of the camera modules.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Embodiments of the present invention will now be described in detail with reference to the accompanying drawings. It should be noted that the drawings are not to precise scale and may be exaggerated in thickness of lines or size of components for descriptive convenience and clarity. Furthermore, the terms used herein are defined by taking functions of the present invention into account and can be changed according to user or operator's custom or intention. Therefore, definition of the terms should be made according to the overall disclosure set forth herein.

Figure 1:
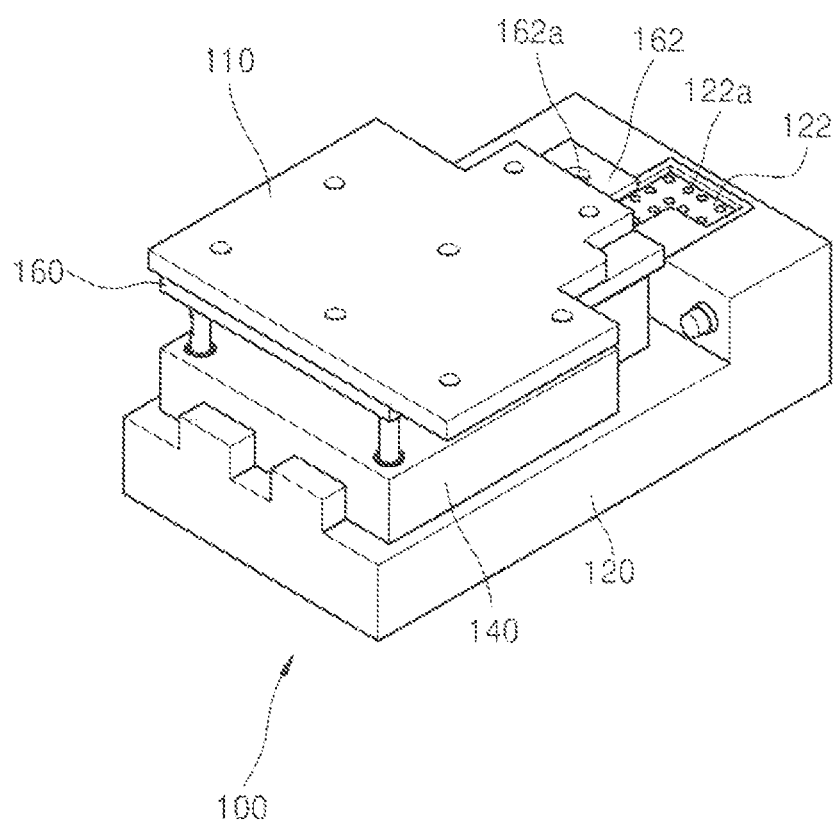
FIG. 1 is a perspective view of a test socket for camera modules according to one embodiment of the present invention.
Figure 2:
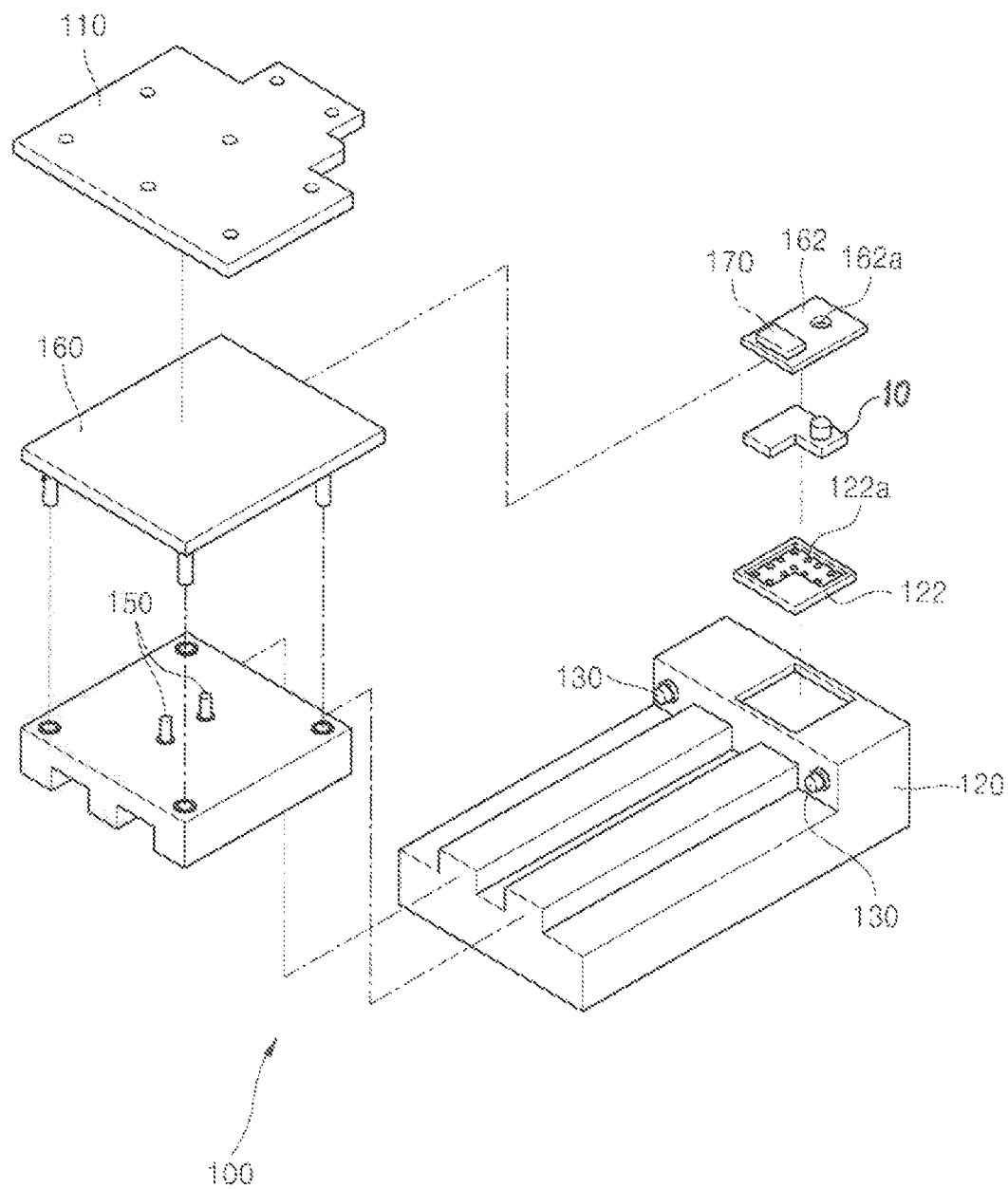
FIG. 2 is an exploded perspective view of the test socket for camera modules according to the embodiment of the present invention.

FIG. 1 is a perspective view of a test socket for camera modules according to one embodiment of the present invention, and FIG. 2 is an exploded perspective view of the test socket for camera modules according to the embodiment of the present invention.

A test socket 100 for camera modules according to one embodiment is configured to automatically hold and inspect a camera module. The test socket 100 includes a base plate 120, a slider 140, a vertical cylinder 150, and an upper plate 160.

The base plate 120 includes a loading unit 122 which receives a camera module to be inspected.

The loading unit 122 may have a groove shape corresponding to a shape of a lower portion of the camera module, and include an adsorption groove 122a for vacuum-suctioning the camera module.

The adsorption groove 122a is connected to a separate vacuum unit that suctions the camera module such that the camera module can be firmly secured to the loading unit 122, when the camera module is seated thereon.

The slider 140 is horizontally movable with respect to the base plate 120.

The slider 140 and the base plate 120 may be connected to a separate horizontal moving unit (not shown) such that the slider 140 can be horizontally reciprocated with respect to the base plate 120.

The slider 140 is reciprocated between a forward location closest to the camera module placed on the loading unit 122 and a backward location farthest from the camera module.

The base plate 120 may be provided with a shock absorption unit 130 to relieve impact between the slider 140 and the base plate 120 when the slider 140 approaches the camera module. Here, the shock absorption unit 130 is provided to a portion of the base plate 120, which will contact the slider 140 when the slider 140 approaches the camera module.

Here, the shock-absorption unit 130 may be provided in the form of a spring and serves as a stopper which restricts movement of the slider 140.

The upper plate 160 is connected to the slider 140 to be movable up or down. More specifically, the upper plate 160 and the slider 140 are connected to each other through a vertical cylinder 150 which has a variable length in a vertical direction.

The vertical cylinder 150 may be reciprocated by pneumatic or hydraulic pressure.

Thus, the vertical cylinder 150 may include a pneumatic cylinder, a hydraulic cylinder, an electromotive cylinder, etc.

A printed circuit board (PCB) 110 is fastened to an upper side of the upper plate 160. The PCB 110 may be fastened to the upper plate 160 by bolts and nuts to be easily detached therefrom or attached thereto.

In addition, the upper plate 160 is provided with a cover 162 that encloses an upper portion of the camera module.

A lower portion of the camera module is enclosed by the loading unit 122, and the upper portion of the camera module is enclosed by the cover 162. That is, the camera module can be closely and firmly secured between the loading unit 122 and the cover 162.

In addition, the cover 162 is provided with a through-hole 162*a* through which a lens unit of the camera module is exposed.

To test the camera module, the lens unit must be exposed, since the performance of the lens unit can be evaluated only when the lens unit is exposed.

The loading unit 122 or the cover 162 is provided with a pin block 170 which will be connected to a contact point of the camera module.

The pin block 170 is electrically connected to the camera module and operates the camera module to evaluate whether the camera module can operate normally.

The loading unit 122 and the cover 162 are detachably attached to the test socket, whereby the test socket can be used to test camera modules having various shapes.

Figure 3:
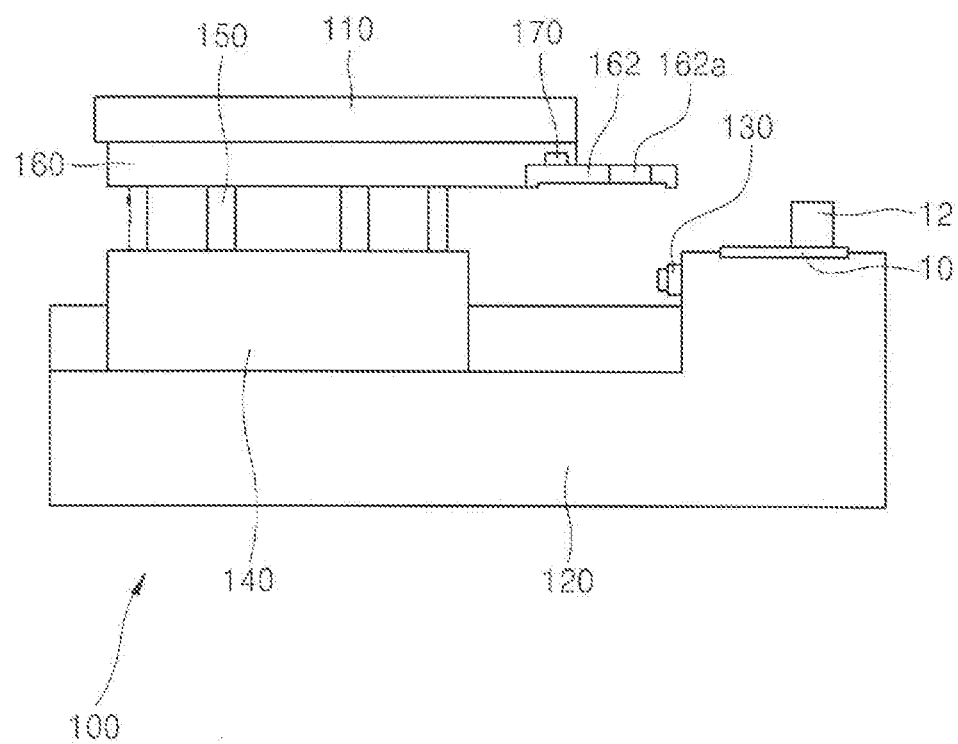
FIG. 3 is a side view of the test socket according to the embodiment of the present invention, in which a slider is moved to a backward location.
Figure 4:
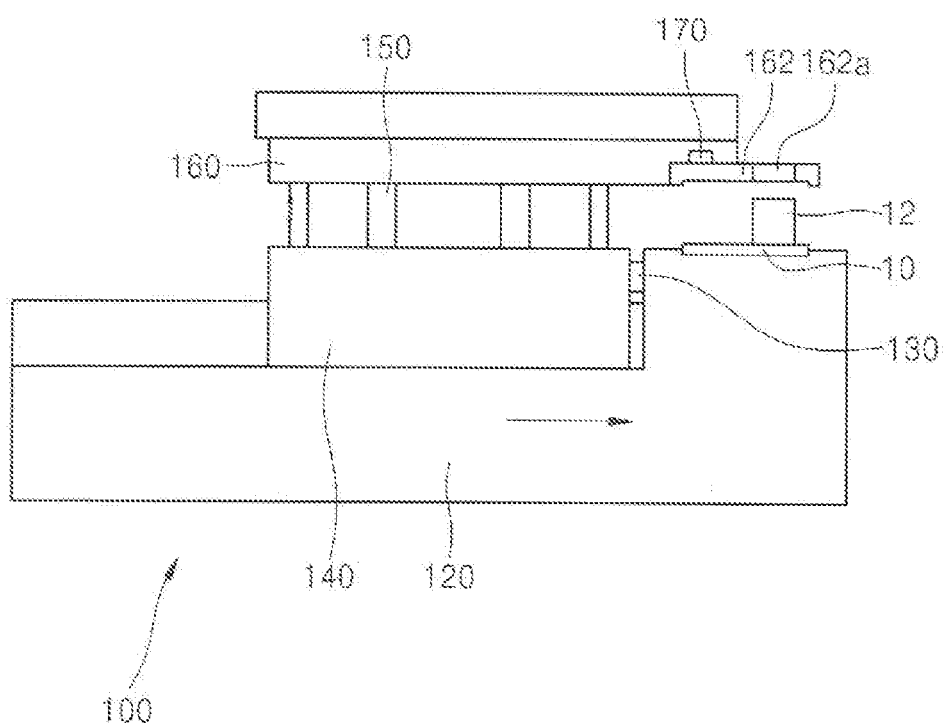
FIG. 4 is a side view of the test socket according to the embodiment of the present invention, in which the slider is moved to a forward location.

FIG. 3 is a side view of the test socket according to the embodiment of the present invention, in which the slider is moved to a backward location, and FIG. 4 is a side view of the test socket according to the embodiment of the present invention, in which the slider is moved to a forward location.

Referring to FIGS. 3 and 4, the slider 140 is reciprocated between the forward location and the backward location.

The upper plate 160 coupled to the slider 140 is also moved together with the slider 140.

As shown in FIG. 3, the loading unit (122 of FIG. 1) having the camera module 10 placed thereon may be open at an upper side thereof when moved to the backward location. This configuration allows the camera module 10 to be easily supplied to the loading unit (122 of FIG. 1) at the backward location.

After the camera module 10 is placed on the loading unit at the backward location of the slider 140, the slider 140 is moved to the forward location. At this time, the upper plate 160 is maintained in a state of being lifted from the slider 140.

When the slider 140 is moved to the forward location, the cover 162 of the upper plate 160 is placed vertically above the camera module 10.

Figure 5:
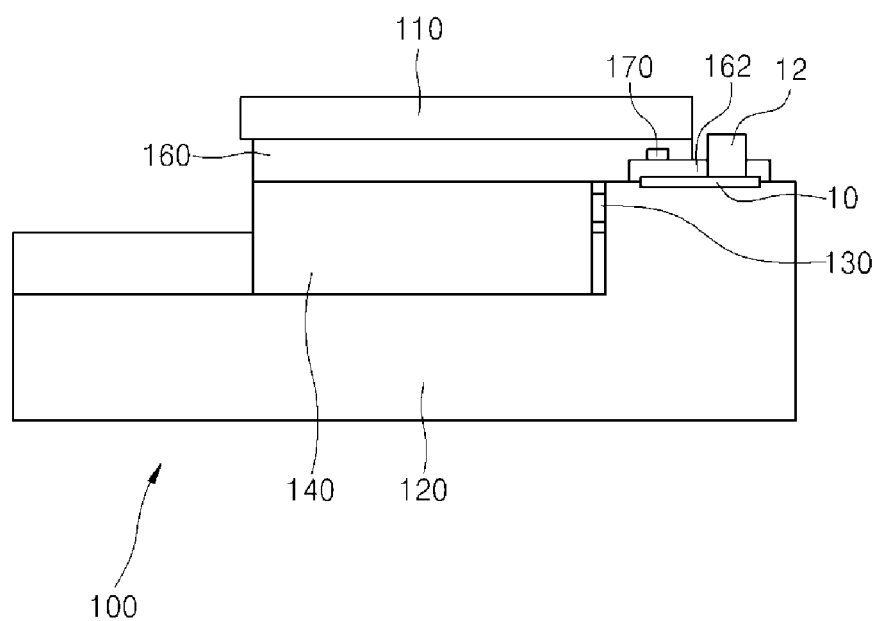
FIG. 5 is a side view of the test socket according to the embodiment of the present invention, in which an upper plate is moved down.

FIG. 5 is a side view of the test socket according to the embodiment of the present invention, in which the upper plate is moved down.

As shown therein, the upper plate 160 is moved down after the slider 140 is moved to the forward location.

When the slider 140 is placed at the forward location, the cover 162 of the upper plate 160 is placed above the camera module 10. As the upper plate 160 is moved downwards, the cover 162 is also moved downwards and compresses the upper side of the camera module 10.

As a result, the camera module 10 is compressed and secured between the loading unit (122 of FIG. 1) and the cover 162, whereby the pin block 170 is electrically connected to the camera module 10, thereby enabling inspection of the camera module 10.

As described above, the cover 162 is formed with the through-hole 162*a* (FIG. 4), whereby the lens unit 12 of the camera module 10 can be exposed through the through-hole 162*a* (FIG. 4).

Although the pin block 170 is illustrated as being provided to the cover 162 in this embodiment, it should be noted that the present invention is not limited thereto. Alternatively, the pin block 170 may be provided to the loading unit 122 (FIG. 2) or to both the loading unit 122 (FIG. 2) and the cover 162 according to the kind of camera module to be inspected.

The pin block 170 is connected to an inspection device via the PCB 110 or the like.

When the pin block 170 is formed on the cover 162, the PCB 110 may be attached to the upper plate 160. When the pin block 170 is formed on the loading unit 122 (FIG. 2), the PCB 110 may be attached to the base plate 120.

In addition, the loading unit 122 (FIG. 2) and the cover 162 may be detachably attached to the test socket.

With this configuration, the test socket may be applied to inspection of camera modules having various shapes.

The test socket may be used to inspect camera modules having various shapes simply by replacing the loading unit 122 (FIG. 2) and the cover 162.

Next, operations of the test socket 100 for camera modules will be described.

With the slider 140 placed at a backward location with respect to the base plate 120 and the upper plate 160 raised, a camera module 10 to be inspected is supplied to the loading unit 122 of the base plate 120.

The camera module 10 may be supplied by an operator or by an automatic feeder.

When the camera module 10 is placed on the loading unit 122, the slider 140 is moved to a forward location and then the upper plate 160 is lowered, thereby allowing the cover 160 to compress an upper side of the camera module 10.

In this state, the pin block 170 is electrically connected to the camera module 10, thereby allowing inspection of the camera module 10.

After inspection of the camera module 10, the upper plate 160 is lifted and the slider 140 is moved to the backward location. Then, the camera module 10 is removed from the loading unit 122, and the same operation is repeated with respect to the next camera module 10.

In this way, in the test socket 100 for camera modules according to the embodiment of the invention, the slider 140 and the upper plate 160 are moved to connect with the camera module 10 when the camera module 10 is supplied to the loading unit 122, thereby enabling automated inspection of the camera module.

As such, the test socket 100 for cameras module according to the present invention is automatically operated to closely and firmly hold and inspect the camera module 10 when the camera module 10 is placed thereon, thereby enabling automated or semi-automated inspection of the camera module 10.

Although some embodiments have been provided to illustrate the present invention, it should be understood that these embodiments are given by way of illustration only, and that various modifications, variations, and alterations can be made without departing from the spirit and scope of the present invention. The scope of the present invention should be limited only by the accompanying claims and equivalents thereof.

What is claimed is:

1. A test socket for camera modules, comprising:
   a base plate provided with a loading unit on which a camera module to be tested is placed;
   a slider formed on the base plate and horizontally movable thereon;
   an upper plate formed on the slider to move up or down thereon, and including a cover corresponding to an upper portion of the camera module;
   a vertical cylinder allowing the upper plate to vertically reciprocate with respect to the slider; and
   a pin block formed on the loading unit or the cover and connected to a contact point of the camera module;
   wherein the slider is reciprocated between a forward location close to the camera module and a backward location separated from the camera module, and the cover is placed vertically above the camera module at the forward location, and is spaced from the camera module at the backward location; and
   wherein, when the slider is placed at the forward location and the cover is at a lower position to compress and secure the camera module between the loading unit and the cover, the lens unit of the camera module extends through the through-hole of the cover and projects upwardly from an upper opening of the through-hole.

2. The test socket for camera modules according to claim 1, wherein the vertical cylinder is reciprocated by pneumatic or hydraulic pressure.

3. The test socket for camera modules according to claim 1, wherein the loading unit comprises an adsorption groove connected to a vacuum unit.

4. The test socket for camera modules according to claim 1, wherein the cover comprises a through-hole through which a lens unit of the camera module is exposed.

5. The test socket for camera modules according to claim 1, wherein the loading unit and the cover are detachably attached to the test socket.

6. The test socket for camera modules according to claim 5, wherein the loading unit and the cover are detachably attached to the test socket.

* * * * *